United States Patent

Kolycheck et al.

[11] Patent Number: 5,159,053
[45] Date of Patent: * Oct. 27, 1992

[54] POLYURETHANE FOR USE IN ELECTROSTATIC DISSIPATING APPLICATIONS

[75] Inventors: Edmond G. Kolycheck, Lorain; Elaine A. Mertzel, Rocky River; Francis R. Sullivan, Cleveland Heights, all of Ohio

[73] Assignee: The B. F. Goodrich Company, Akron, Ohio

[*] Notice: The portion of the term of this patent subsequent to Sep. 10, 2008 has been disclaimed.

[21] Appl. No.: 717,951

[22] Filed: Jun. 20, 1991

Related U.S. Application Data

[63] Continuation-in-part of Ser. No. 399,645, Aug. 28, 1989, Pat. No. 5,047,495.

[51] Int. Cl.$^5$ .............................................. C08G 18/38
[52] U.S. Cl. ........................................ 528/76; 528/44; 528/80; 523/220; 524/456
[58] Field of Search .............................. 528/76, 44, 80; 523/220; 524/456

[56] References Cited

U.S. PATENT DOCUMENTS 5,047,495 10/1991 Kolycheck ............................ 528/76

Primary Examiner—Maurice J. Welsh
Assistant Examiner—Duc Troung
Attorney, Agent, or Firm—Laura F. Shunk

[57] ABSTRACT

A thermoplastic polyurethane is provided which has electrostatic dissipative properties. The thermoplastic polyurethane comprises the polymeric reaction product of an ethylene ether oligomer glycol intermediate co-reacted with a non-hindered diisocyanate and an extender glycol to produce the polyurethane polymer. The ethylene ether oligomer glycol intermediate comprises a polyethylene glycol. The oligomer glycol intermediate has an average molecular weight from about 500 to about 5,000.

17 Claims, No Drawings

POLYURETHANE FOR USE IN ELECTROSTATIC DISSIPATING APPLICATIONS

CROSS-REFERENCE

This is a Continuation-In-Part of copending application, Ser. No. 07/399,645, filed Aug. 28, 1989, now U.S. Pat. No. 5,047,495, entitled "Polyurethane For Flexible Fuel Containers."

FIELD OF THE INVENTION

The present invention pertains to thermoplastic polyurethane compositions useful as electrostatic dissipating agents or compositions.

BACKGROUND

It has been discovered that the polyurethane composition useful for the fabric reinforced, portable flexible fuel containers disclosed in a previously filed related application also is applicable for electrostatic dissipating applications.

The formation and retention of charges of static electricity on the surface of most plastics is well known. Plastic materials have a significant tendency to accumulate static electrical charges due to low electrical conductivity. The presence of static electrical charges on sheets of thermoplastic film, for example, can cause the sheets to adhere to one another thus making their separation for further processing more difficult. Moreover, the presence of static electrical charges causes dust to adhere to items packaged in a plastic bag, for example, which may negate any sales appeal.

The increasing complexity and sensitivity of microelectronic devices makes the control of static discharge of particular concern to the electronic industry. Even a low voltage discharge can cause severe damage to sensitive devices. The need to control static charge buildup and dissipation often requires the total assembly environment to be constructed of partially conductive materials. It also may require electrostatic protective packages, tote boxes, holders, housings, casings, and covers be made from conductive polymeric materials to store, ship, protect, or support electrical devices and equipment.

The prevention of the buildup of static electrical charges which accumulate on plastics during manufacturing or use has been prevented by the use of various electrostatic dissipative (ESD) materials. These materials can be applied as a coating which may be sprayed or dip coated on the article after manufacture although this method usually results in a temporary solution. Alternatively these materials can be incorporated into the polymer during processing thereby providing a greater measure of permanence.

However, the incorporation of these lower molecular weight electrostatic dissipative materials (antistatic agents) into the various polymers has its own limitations. For example, during the hot temperatures required during conventional processing many of the antistatic agents cannot withstand high temperatures and are damaged or destroyed, thereby being rendered useless with respect to their ESD properties. Also, many of the higher molecular weight ESD agents are not miscible with the base polymers employed, and if the refractive indices differ by more than about 0.02 there can be a substantial reduction in the transparency of the composition. These compositions may be unacceptable for transparent applications. For example, in an immiscible polymer blend where the dispersed phase particle size is greater than 0.1 micron the smaller the difference in the refractive indices between the additives and the base polymer the greater the clarity of the article made from the mixture.

A large number of antistatic agents are also either cationic or anionic. These tend to cause the degradation of plastics, particularly PVC, and result in discoloration or loss of physical properties. Other antistatic agents have significantly lower molecular weights than the base polymers themselves. Often these lower molecular weight antistatic agents possess undesirable lubricating properties and are difficult to incorporate into the polymer. Incorporation of the lower molecular weight antistatic agents into the polymers often will reduce the moldability of the base plastic because the antistatic agents can move to the surface of the plastic during processing and frequently deposit a coating on the surface of the molds, possibly destroying the surface finish on the articles of manufacture. In severe cases, the surface of the article of manufacture becomes quite oily and marbleized. Additionally, the lower molecular weight ESD agents often tend to lose their ESD capability due to evaporation, develop undesirable odors, and can promote stress cracking or crazing on the surface of an article in contact with the article of manufacture.

One of the known lower molecular weight antistatic agents is a homopolymer or copolymer oligomer of ethylene oxide. Generally, use of the lower molecular weight polymers of ethylene oxide or polyethers as antistatic agents are limited by the above-mentioned problems relative to lubricity, surface problems, or less effective ESD properties. Further, these low molecular weight polymers can be easily extracted or abraded from the base polymer thereby relinquishing any electrostatic dissipative properties.

There are several examples of high molecular weight electrostatic dissipative agents in the prior art. In general these additives have been high molecular weight polymers of ethylene oxide or a derivative thereof like propylene oxide, epichlorohydrin, glycidyl ethers and the like. It has been a requirement that these additives be high molecular weight materials to overcome the problems mentioned above. However, these prior art ESD additives result in articles having high haze values and thus are not transparent enough for some end uses.

Prior to the present invention the utilization of low molecular weight polyether oligomers as antistatic agents was impractical as these low molecular weight oligomers suffer from problems such as blooming.

Other polyurethane polymers including polyester based polyurethanes are disclosed in the following patents: U.S. Pat. No. 2,871,218 disclosing extruded plastic sheets resistant to hydrocarbon solvents but soluble in polar solvents; U.S. Pat. No. 4,400,498 pertaining to heat and solvent resistant crosslinked polyurethanes particularly adapted to disperse fillers and pigments and useful for adhesives; U.S. Pat. No. 4,191,818 directed to heat resistent, crosslinked crystalline polyurethanes used in elastomeric cast moldings; U.S. Pat. No. 3,214,411 suggesting polyester polyurethane polymers adapted to be heat crosslinked in high heat injection molding processes; and U.S. Pat. No. 3,012,992 disclosing load bearing, crosslinked polyurethane castings and plastics. U.S. Pat. No. 4,439,552 discloses cellular polyurethane foams, whereas U.S. Pat. No. 4,762,884 discloses radiation activated crosslinked polyurethanes.

SUMMARY OF THE INVENTION

It has been found a polyurethane polymer will exhibit good electrostatic dissipative properties for use as an ESD agent in blends or by itself. In particular, when used alone, it may also exhibit excellent transparency values. The polyurethane polymer has an average molecular weight from about 60,000 to about 500,000 and comprises a hydroxyl terminated ethylene ether oligomer glycol intermediate having an average molecular weight from about 500 to 5,000 reacted with a non-hindered diisocyanate and an extender glycol to produce a high molecular weight thermoplastic polyurethane. The ethylene ether oligomer glycol intermediate is a polyethylene glycol. These and other advantages of the present invention will become more apparent by referring to the detailed description of the invention and the illustrative examples.

DETAILED DESCRIPTION OF THE INVENTION

In the first embodiment of the invention, the thermoplastic polyurethane polymer of the present invention, useful as an elastomeric melt or binder in a fabric reinforced flexible fuel tank, comprises the reaction of a hydroxyl terminated ethylene ether oligomer intermediate with a non-hindered diisocyanate and an extender glycol, where the oligomer can be a diethylene glycol-aliphatic polyester, or a polyethylene glycol. For the second embodiment the oligomer is strictly a polyethylene glycol. Referring first to the polyester intermediate, a hydroxyl terminated, saturated polyester polymer is synthesized by reacting excess equivalents of diethylene glycol with considerably lesser equivalents of an aliphatic, preferably an alkyl, dicarboxylic acid having four to ten carbon atoms where the most preferred is adipic acid. Other useful dicarboxylic acids include succinic, glutaric, pimelic, suberic, azelaic and sebacic acids. The most preferred polyester intermediate is polydiethylene glycol adipate. In accordance with this aspect of the present invention, excess moles of diethylene glycol are reacted with lesser moles of dicarboxylic acid at levels from about 5 mole percent to about 50 mole percent excess of glycol to provide a hydroxyl terminated polyester oligomer chain having an average molecular weight between about 500 to 5000 and preferably between about 700 and 2500. The short chain polyester oligomer contains repeating diethylene ether structures and comprises on an equivalent basis from about 1.05 to 1.5 equivalents of diethylene glycol co-reacted with one equivalent of dicarboxylic acid to produce the low molecular weight polyester oligomer intermediate. The high excess equivalents of diethylene glycol controls the molecular weight of the polyester oligomer preferably below 2500 and further assures a hydroxyl terminated linear polyester oligomer. The polyester oligomers synthesized by reacting the diethylene glycol with lesser equivalents of dicarboxylic acid at temperatures of from about 300° F. to 450°° F. in the absence or in the presence of an esterification catalyst such as stannous chloride for time sufficient to reduce the Acid No. to about zero.

The hydroxyl terminated polyester oligomer intermediate is further reacted with considerably excess equivalents of non-hindered diisocyanate along with extender glycol in a so-called one-shot or simultaneous coreaction of oligomer, diisocyanate, and extender glycol to produce the very high molecular weight linear polyurethane having an average molecular weight broadly from about 60,000 to 500,000, preferably from about 80,000 to 180,000, and most preferably from about 100,000 to 180,000. The very high molecular weight linear polyurethane based on the polyester oligomer in accordance with this aspect of the invention is unique in that an extraordinary high molecular weight polyurethane polymer is produced from a low molecular weight polyester oligomer prepolymer.

In accordance with a preferred aspect of this invention an ethylene ether oligomer glycol intermediate comprising a polyethylene glycol can be co-reacted with non-hindered diisocyanate and extender glycol to produce the high molecular weight, polyurethane polymer. Useful polyethylene glycols are linear polymers of the general formula H—(OCH$_2$CH$_2$)—$_n$OH where n is the number of repeating ethylene ether units and n is at least 11 and between 11 and about 115. On a molecular weight basis, the useful range of polyethylene glycols have an average molecular weight from about 500 to 5000 and preferably from about 700 to 2500. Commercially available polyethylene glycols useful in this invention are typically designated as polyethylene glycol 600, polyethylene glycol 1500, and polyethylene glycol 4000.

In accordance with this invention, high molecular weight thermoplastic polyurethanes are produced by reacting together preferably in a one-shot process the ethylene ether oligomer glycol intermediate, an aromatic or aliphatic non-hindered diisocyanate, and an extender glycol. On a mole basis, the amount of extender glycol for each mole of oligomer glycol intermediate is from about 0.1 to about 3.0 moles, desirably from about 0.2 to about 2.1 moles, and preferably from about 0.5 to about 1.5 moles. On a mole basis, the high molecular weight polyurethane polymer comprises from about 0.97 to about 1.02 moles, and preferably about 1.0 moles of nonhindered diisocyanate for every 1.0 total moles of both the extender glycol and the oligomer glycol (i.e. extender glycol +oligomer glycol =1.0).

Useful non-hindered diisocyanates comprise aromatic non-hindered diisocyanates and include, for example, 1,4-diisocyanatobenzene (PPDI), 4,4'-methylene-bis (phenyl isocyanate) MDI), 1,5-naphthalene diisocyanate (NDI), m-xylene diisocyanate (XDI), as well as non-hindered, cyclic aliphatic diisocyanates such as 1,4-cyclohexyl diisocyanate (CHDI), and H$_{12}$ MDI. The most preferred diisocyanate is MDI. Suitable extender glycols (i.e. chain extenders) are aliphatic short chain glycols having two to six carbon atoms and containing only primary alcohol groups. Preferred glycols include diethylene glycol, 1,3-propane diol, 1,4-butane diol, 1,5-pentane diol, and 1,6-hexane diol with the most preferred glycol being 1,4-butane diol.

In accordance with the present invention, the hydroxyl terminated ethylene ether oligomer intermediate, the non-hindered diisocyanate, and the aliphatic extender glycol are co-reacted simultaneously in a one-shot polymerization process at a temperature above about 100° C. and usually about 120°C., whereupon the reaction is exothermic and the reaction temperature is increased to about 200° C. to 250° C.

The merits of the present invention will be better understood by referring to the following illustrative examples.

EXAMPLE 1

Polyester

Poly(diethylene adipate) glycol is commercially available as Formrez 11-112 from Witco and Inolex 1100-110 and had the following characteristics:

| | |
|---|---|
| Backbone molecular weight | 1103 |
| Hydroxyl number | 101 |
| Acid No. | 0.1 |
| Percent water content | 0.024 |

The resulting polyester was blended with 1,4-butane diol and MDI on a weight basis as follows:

Polyurethane 0.25 moles (275 grams) of poly(diethylene adipate) glycol with a molecular weight of 1100 was blended at 60° C. with 0.515 moles (46.36 grams) of 1,4-butanediol chain extender. This blend or physical mixture was then reacted with 0.765 moles (191.25 grams) of methylene bis diphenyl diisocyanate (MDI) by a standard random melt polymerization procedure. This procedure involved heating the poly(diethylene adipate) glycol/1,4-butane diol blend and MDI separately to about 100° C. and then mixing the ingredients. The reaction is exothermic and raises the temperature to about 200 to 250° C. in about 1 to 5 minutes, during which time polymerization takes place as evidenced by an increase in viscosity. Stabilizers such as UV absorbers and antioxidants and lubricants (i.e. processing aids) can be added as desired during the polymerization step or added to the monomers prior to the reaction. The polyurethane had a melt index (190° C./8700 grams) of 35 grams/10 minutes.

Polyurethane Test

Samples were prepared for fuel immersion testing in fuels B and D immersion testing with the results indicated hereafter in Tables IA and IB.

TABLE IA

| Fuel B resistance according to ASTM D471-79. |
|---|
| a) Immediate melt index (190° C./8700 gms. load) = 35 gms/10 min. |
| b) Original properties |
|     Tensile strength = 5000 psi |
|     % Elongation = 570 |
|     300% Modulus = 1900 psi |
| c) Fuel B immersion 70 hours @ 23° C. |
|     Tensile strength = 4500 psi |
|     % Elongation = 600 |
|     300% Modulus = 1700 psi |
|     % Volume change = 8.43 |
|     % Weight change = 5.89 |
| d) Fuel B immersion two weeks @ 23° C. |
|     Tensile strength = 4300 psi |
|     % Elongation = 600 |
|     300% Modulus = 1700 psi |
|     % Volume change = 7.33 |
|     % Weight change = 4.69 |

TABLE IB

| Fuel D resistance according to ASTM D471-79. |
|---|
| a) Immediate melt index (190° C./8700 gms. load) = 35 gms/10 min. |
| b) Original properties |
|     Tensile Strength = 5000 psi |
|     % Elongation = 570 |
|     300% Modulus = 1900 psi |
| c) Fuel D immersion 70 hours @ 23° C. |
|     Tensile strength = 3750 psi |
|     % Elongation = 600 |
|     300% Modulus = 1550 psi |
|     % Volume change = 11.24 |
|     % Weight change = 7.09 |
| d) Fuel D immersion two weeks @ 23° C. |
|     Tensile strength = 3600 psi |
|     % Elongation = 570 |
|     300% Modulus = 1500 psi |
|     % Volume change = 9.55 |
|     % Weight change = 6.85 |

EXAMPLE 2

0.2 moles (290 grams) of polyethylene glycol (Dow E-1450) with a molecular weight of 1450 was blended at 60° C. with 0.844 moles (75.96 grams) of 1,4-butanediol chain extender. This blend or physical mixture was then reacted with 1.044 moles (26 grams) of methylene bis diphenyl diisocyanate (MDI) by a standard high temperature random melt polymerization procedure. The polymerization procedure was as described in Example 1. Test data including physical properties and fuel resistance are set forth in Tables IIA, IIB, and IIC.

TABLE IIA

| Evaluation of Polyurethane of Example 2 | | |
|---|---|---|
| | ASTM Test Procedure | |
| Tensile Strength[1] | D-412 | 3060 |
| Elongation, % | | 560 |
| 100% Modulus, psi | | 1100 |
| 300% Modulus, psi | | 2030 |
| Tensile Set, % | | 20 |
| Graves Tear, ppi | D-624 (Die C) | 413 |
| Trouser Tear, ppsi | D-470 | 117 |
| Shore Hardness, A/D | D-2240 | 85/40 |
| Vicat Softening, °C. | D-1525 (B) | 95 |
| Tg, °C. TP-113 | | −24 |
| Specific Gravity | D-792 | 1.22 |
| Melt Index (190° C./ 8700 gms), gms/10 min. | | 29.5 |

[1]30 mil extruded strip.

TABLE IIB

| Evaluation of Hydrolytic Stability | |
|---|---|
| Melt Index (190° C./8700 gm) gms/10 min. | 40 |
| Original | |
| Tensile Strength, psi | 3470 |
| Elongation, % | 490 |
| 100% Modulus, psi | 1450 |
| 300% Modulus, psi | 2600 |
| Two Weeks Water @ 71° C.[1] | |
| Tensile Strength, psi | 3750 (+8) |
| Elongation, % | 460 (−6) |
| 100% Modulus, psi | 1900 (+31) |
| 300% Modulus, psi | 3020 (+16) |
| Four Weeks Water @ 71° C.[1] | |
| Tensile Strength, psi | 3490 (+0.6) |
| Elongation, % | 480 (−2) |
| 100% Modulus, psi | 1840 (+27) |
| 300% Modulus, psi | 2740 (+5) |
| Six Weeks Water @ 71° C.[1] | |
| Tensile Strength, psi | 3350 (−3) |
| Elongation, % | 410 (−16) |
| 100% Modulus, psi | 1900 (+31) |

TABLE III

EFFECT OF POLYOL STRUCTURE ON THE FUEL B RESISTANCE OF THE THERMOPLASTIC POLYURETHANE

| | TYPE OF POLYOL | | |
|---|---|---|---|
| | EX. 2 Poly(diethylene ether adipate) glycol | A Poly(tetramethylene adipate) glycol | B Polycaprolactone |
| Immediate Melt Index, gms./1 min.[1] | 35.0 | 27.0 | 32.0 |
| Original Properties | | | |
| Tensile Strength, psi | 5000 | 8400 | 5640 |
| Elongation, % | 570 | 500 | 430 |
| 300% Modulus, psi | 1900 | 3200 | 3100 |
| Immersion Fuel B, 70 hrs. @ 23° C. | | | |
| Tensile Strength, psi | 4500 (−10) | 5700 (−32) | 4800 (−15) |
| Elongation, % | 600 | 510 | 500 |
| 300% Modulus, psi | 1700 | 2000 | 1900 |
| % Volume Change | 8.43 | 10.95 | 15.38 |
| % Weight Change | 5.89 | 7.64 | 10.30 |
| Immersion Fuel B Two Weeks @ 23° C. | | | |
| Tensile Strength, psi | 4300 (−14) | 5800 (−31) | 4700 (−17) |
| Elongation | 600 | 520 | 520 |
| 300% Modulus, psi | 1700 | 1900 | 2000 |
| % Volume Change | 7.33 | 11.18 | 15.21 |
| % Weight Change | 4.69 | 7.54 | 10.31 |

[1]Conditions 190° C./8700 grams load.
( ) = % Change

| Evaluation of Hydrolytic Stability | |
|---|---|
| 300% Modulus, psi | 2800 (+8) |

( ) = % Change
[1]After immersion, prior to stress-strain testing, all samples were conditioned according to Method 6111 of FED-STD-601. All samples are dumbbells from a 75 mil compression molded tensile sheet.

TABLE IIC

Evaluation of Produced Fuel "D" Resistance

| | Sample Number 161-212-46B |
|---|---|
| Melt Index (190° C./8700 gm) gms/10 min. | 40 |
| Original Properties[1] | |
| Tensile Strength, psi | 3870 |
| Elongation, % | 600 |
| 100% Modulus, psi | 1280 |
| 300% Modulus, psi | 2220 |
| Immersion Fuel D 70 hrs. @ 23° C. | |
| Tensile Strength, psi | 3320 |
| Elongation, % | 500 |
| 100% Modulus, psi | 1110 |
| 300% Modulus, psi | 2220 |
| % Volume Change | 10.2 |
| % Weight Change | 7.1 |
| Immersion Fuel D 2 weeks @ 23° C. | |
| Tensile Strength, psi | 3500 |
| Elongation, % | 440 |
| 100% Modulus, psi | 1200 |
| 300% Modulus, psi | 2420 |
| % Volume Change | 9.9 |
| % Weight Change | 7.2 |

[1]75 mil tensile sheets

As apparent from the above data, good physical properties such as tensile strength, modulus, tear strength, and the like were obtained as well as good hydrolytic stability and fuel "D" resistance.

EXAMPLE 3

The poly(diethylene ether adipate) glycol of Example 2 was compared to two similarly prepared polyurethanes except that the intermediate was replaced by (A) poly(tetramethylene adipate) glycol or (B) polycaprolacton. Various physical data are set forth in Table III.

As apparent from Table III, the weight and volume change utilizing the polyester intermediate of the present invention, that is Example 2, was much lower that existing heretofore polyurethanes made utilizing the intermediates of A and B.

EXAMPLE 4

A polyurethane very similar to that of Example 1, made in a manner as set forth in Example 1, was tested for styrene resistance and compared to a similar conventional polyurethane made in a manner similar to Example 1 by reacting poly(tetramethylene adipate) glycol, 1,4-butane diol, and MDI.

Procedure

Films of about 250 microns of each test sample were melt coated on release nylon. Test samples were immersed in styrene for 1 day, 3 days, and 7 days respectively. Stress-strain properties, volume swell, and weight gain were measured at the end of each timed immersion. The results are shown in Table IV.

TABLE IV

| Styrene Resistance | CONTROL | | | EX. 1 TYPE POLYURETHANE | | |
|---|---|---|---|---|---|---|
| | 1d | 3d | 7d | 1d | 3d | 7d |
| Vol. Swell % | 59 | 62 | 68 | 15 | 15 | 13 |
| Wt. Gain % | 43 | 44 | 47 | 24 | 22 | 22 |

As apparent from Table IV, the volume swell and the weight gain of the polyurethane of the present invention was dramatically lower than that of a commercial polyurethane heretofore utilized in fuel resistant applications.

In the new embodiment of the present invention, the polyurethane is found to exhibit electrostatic dissipative properties, and further to present a clear composition which can be used for applications such as sheets or films, fuel handling including vapor return equipment and fuel lines, business equipment, coatings for floors such as clean rooms and construction, floorings, mats, electronic packaging and housings, chip holders, chip rails, tote bins and tote bin tops and medical applications. These articles can be shaped by various molding techniques including injection molding, vacuum molding, blow molding, compression molding, slush molding as well as casting thermoforming, extrusion, or the like. The composition can be blended with other polymers as an ESD agent.

This composition has the following electrical properties:

(a) surface resistivity of less than about $1 \times 10^{14}$ Ohms/sq, as measured according to ASTM D-257; or
(b) volume resistivity of less than about $1 \times 10^{14}$ Ohms-cm, as measured according to ASTM D-257. The clarity can be defined as follows:
   (I) a percent light transmission greater than 50% for 20 mil film as measured according to ASTM D-1003-61 ; and
   (11) a percent haze value less than 60% for a 20 mil film as measured using a Hunterlab model D-54P-5 spectrophotometer or equivalent.

The spectrophotometer was calibrated with haze standards having nominal values of 5 and 10, Part No. HG-1214, as supplied by Gardner Laboratory Division, Bethesda, MD.

In a preferred embodiment the surface resistivity will be less than about $1 \times 10^{13}$ Ohms/sq, and the volume resistivity will be less than about $1 \times 10^{13}$ Ohms-cm. In the most preferred embodiment the surface resistivity of composition will be less than about $1 \times 10^{12}$ Ohms/sq, and the volume resistivity less than about $1 \times 10^{12}$ Ohms cm. The preferred light transmission is greater than 70% for a 20 mil film as measured according to ASTM D-1003-61; aDd the preferred haze value is less than 30% for a 20 mil film. The most preferred light transmission is greater than 80% for a 20 mil film as measured according to ASTM D-1003-61; and the most preferred haze value is less than 20% for a 20 mil film.

Surface and volume resistivity testing is conducted in accordance with ASTM D257. In this test, an adapter compresses an upper electrode and a lower circular electrode encircled with a ringing electrode. A sheet sample (3.5 inches in diameter and ⅛-1/16 inch thick) is placed between the upper and lower electrodes, and a voltage of 500 volts was applied between the electrodes. After 60 seconds, the resistance is recorded using an ohmmeter and converted into surface resistivity in Ohms/square or volume resistivity in Ohms-cm.

The static decay test is carried out in accordance with Federal Test Method Standard 101B, Method 4046.1, "Electrostatic Properties of Materials" with a Static Decay Meter, model 406C obtained, from Electro-Tech Systems, Inc. Static decay is a measure of the ability of a material, when grounded, to dissipate a known charge that has been induced on the surface of the material. A sheet sample (3"×6") with ⅛-1/16 inch thickness is placed between clamp electrodes contained in a Faraday cage. A 5,000 volt positive charge is applied to the surface of the specimen and the time in seconds required to dissipate the charge to 500 volts (10% of its initial value) or to 50 volts (1% of its initial value), after a ground is provided, is then measured. For the purposes of the following examples, this test was run on unconditioned samples and on samples conditioned for 48 hours at 15% relativity humidity (RH).

EXAMPLES

The invention will now be illustrated by examples. The examples are not intended to be limiting of the scope of the present invention. In conjunction with the general and detailed description above, the examples provide further understanding of the present invention and demonstrates some of the preferred embodiments of the invention.

The following Example Nos. 5 to 9 describe the preparation of several ESD polyurethanes.

EXAMPLE 5

Polyethylene glycol (Dow E-600), 0.2 moles (121 grams) having a molecular weight of 603 as determined by end group analysis was reacted with 0.201 moles (50.25 grams) of 4,4'-methylene-bis(phenyl isocyanate) (MDI) by a standard high temperature random melt polymerization procedure. The polymerization procedure involved heating the polyether and MDI separately to about 100° C. and then mixing the ingredients. The reaction is exothermic and raises the temperature to about 200 to 285° C. in about 1 to 5 minutes, during which time polymerization takes place as evidenced by an increase in viscosity. The sample was molded into a plaque and the physical properties were measured. The sample had a volume resistivity of $4.9 \times 10^{10}$ Ohms-cm and a surface resistivity of $8.7 \times 10^{12}$ Ohms/sq.

EXAMPLE 6

Polyurethane 45

Polyethylene glycol (Dow E-1450), 0.2 moles (290 grams) having a molecular weight of 1450 as determined by end group analysis was blended at 60° C. with 0.844 moles (76.064 grams) of I,4-butane diol. This blend or physical mixture was then reacted with 1.044 moles (26.27 grams) of 4,4'-methylene-bis(phenyl isocyanate) (MDI) by a standard high temperature random melt polymerization procedure as described in Example 1. The sample was molded into a plaque and the physical properties were measured. The sample had a volume resistivity of $5.4 \times 10^{10}$ Ohms-cm, a surface resistivity of $6.0 \times 10^{11}$ Ohms/sq and a refractive index of 1.551.

EXAMPLE 7

Polyurethane 56

Polyethylene glycol (Dow E-I450), 0.2 moles (278 grams) having a molecular weight of 1390 as determined by end group analysis was blended at 60° C. with 0.496 moles (44.6 grams) of I,4-butane diol. This blend or physical mixture was then reacted with 0.696 moles (174 grams) of 4,4'-methylene-bis (phenyl isocyanate) (MDI) by a standard high temperature random melt polymerization procedure as described in Example i. The sample was molded into a plaque and the physical properties were measured. The sample had a volume resistivity of $4.2 \times 10^{10}$ Ohms-cm and a refractive index of 1.541.

EXAMPLE 8

Polyurethane 64

Polyethylene glycol (Dow E-1450), 0.4 moles (580 grams) having a molecular weight of 1450 was blended at 60° C. with 0.667 moles (60 grams) of 1,4-butane diol. This blend or physical mixture was then reacted with 1.078 moles (269.5 grams) of 4,4'-methylene-bis(phenyl isocyanate) (MDI) by a standard high temperature random melt polymerization procedure as described in Example 1. The sample was molded into a plaque and the physical properties were measured. The sample had a volume resistivity of $3.6 \times 10^9$ Ohms-cm, a surface resistivity of $4.7 \times 10^{10}$ Ohms/sq, and a refractive index of 1.529.

EXAMPLE 9

Polyurethane 72

Polyethylene glycol (Dow E-1450), 0.3 moles (426 grams) having a molecular weight of 1420 as determined by end group analysis was blended at 60° C. with 0.267 moles (24 grams) of 1,4-butane diol. This blend or physical mixture was then reacted with 0.564 moles (141grams) of 4,4'-methylene-bis (phenyl isocyanate) (MDI) by a standard high temperature random melt polymerization procedure as described in Example I. The sample was molded into a plaque and the physical properties were measured. The sample had a volume resistivity of $9.5 \times 10^9$ Ohms-cm and a refractive index of 1.518.

EXAMPLE 10

The chain extended polymer of Example 2 (polyurethane 45) was compression molded into plaques. The static decay and volume resistivity was then measured and is set forth below. Further, the static decay rates were measured after being conditioned for 48 hours at 15% relative humidity (RH) and unconditioned. These results are summarized in Table I.

TABLE V

| Polyurethane 45 15%<br>Parts by Wt. | STATIC DECAY<br>Seconds | | | |
|---|---|---|---|---|
| | Conditioned at<br>15% RH | Unconditioned | | |
| | 10% | 0% | 10% | 0% |
| 100 | 0.19 | 0.43 | 0.05 | 0.09 |

EXAMPLE 11

Polyethylene glycol (Dow E-1450), 0.2 moles (290g) having a molecular weight of 1473 as determined by end group analysis was blended at 60° C. with 0.348 moles (31.292g) of 1,4-butane diol and 1.6g of Ciba Geigy Irganox i010. This blend or physical mixture was then reacted with 0.545 moles (136.25g) of 4,4'-methylene-bis (phenyl isocyanate) (MDI) by a standard high temperature random melt polymerization procedure. The polymerization procedure involved heating the polyether/1,4-butane diol blend and MDI separately to about 120° C. and then mixing the ingredients. The reaction is exothermic and raises the temperature to about 200 to 285° C. in about 1-5 minutes, during which time polymerization takes place as evidenced by an increase in viscosity. At about 2-5 minutes into the reaction, 2.3g of Hoechst Celanese Wax E is added. The sample was molded into a plaque and the physical properties were measured. The sample had a volume resistivity of $1.13 \times 10^9$ ohm-cm and a surface resistivity of $1.26 \times 10^{10}$ ohms/sq.

While in accordance with the Patent Statutes, the best mode and preferred embodiment has been set forth, the scope of the invention is not limited thereto, but rather by the scope of the attached claims.

What is claimed is:

1. A thermoplastic polyurethane adapted for use as an electrostatic static dissipative agent, comprising:
   a thermoplastic polyurethane having an average molecular weight from about 60,000 to 500,000, a hydroxyl terminated ethylene ether oligomer intermediate having an average molecular weight from about 500 to 5,000 reacted with a non-hindered diisocyanate and an aliphatic extender glycol to produce said thermoplastic polyurethane, said oligomer intermediate being a polyethylene glycol;
   wherein said polyethylene glycol consists of repeating ethylene ether units n wherein n is from about 11 to about 115,
   wherein said non-hindered diisocyanate is an aromatic or cyclic aliphatic diisocyanate,
   wherein said extender glycol consists of nonether glycol having from 2 to 6 carbon atoms and containing only primary alcohol groups.

2. A thermoplastic polyurethane according to claim 1, wherein said polyurethane has a surface resistivity of less than about $1 \times 10^{14}$ Ohms/sq, as measured according to ASTM D-257 and a volume resistivity of less than about $1 \times 10^{14}$ Ohms-cm as measured according to ASTM D-257.

3. A thermoplastic polyurethane according to claim wherein said hydroxyl terminated polyester oligomer (a) contains on the average from 4 to 8 repeating ester units and has an average molecular weight from about 700 to 2500.

4. A thermoplastic polyurethane according to claim 3, wherein the diisocyanate is 4,4'-methylenebis(phenyl isocyanate).

5. A thermoplastic polyurethane according to claim 4, wherein said diisocyanate is simultaneously reacted with said extended glycol and said ethylene ether oligomer intermediate.

6. A thermoplastic polyurethane according to claim 5, wherein the extender glycol is 1,4-butane diol, and wherein the amount of said extender glycol to said oligomer glycol intermediate is from about 0.11 to about 3.0 moles.

7. A thermoplastic polyurethane according to claim 3, wherein the amount of said diisocyanate is from about 0.97 to 1.02 moles for every total one mole of said oligomer intermediate and said extender glycol, and wherein the average molecular weight of said thermoplastic polyurethane is from about 80,000 to about 180,000.

8. A thermoplastic polyurethane according to claim 6, wherein the amount of said diisocyanate is from about 0.97 to 1.02 moles for every total one mole of said oligomer intermediate and said extender glycol, and wherein the molecular weight of said thermoplastic polyurethane is from about 80,000 to about 180,000.

9. A thermoplastic polyurethane according to claim 8, wherein the polyurethane has a percent light transmission greater than 50 percent for 20 mil film as measured according to ASTM D-1003-61; and a percent haze value less than 60 percent for a 20 mil film as measured using a Hunterlab model D-54P-5 spectrophotometer.

10. A thermoplastic polyurethane adapted for use in electrostatic dissipating applications, said polyurethane comprising;
   a) the reaction product of a hydroxyl-terminated ethylene ether oligomer having an average molecular weight of from about 500 to about 5,000, reacted with a nonhindered diisocyanate and an aliphatic extender glycol to produce said thermoplastic polyurethane, said oligomer intermediate being a polyethylene glycol consisting of repeating ethylene ether units n wherein n is from about 4 to about 250; wherein said nonhindered diisocyanate is an aromatic or cycloaromatic diisocyanate; and b) wherein said extender glycol consists of an aliphatic non-ether glycol having from 2 to 6 carbon atoms and containing only primary alcohol groups; said thermoplastic polyurethane being essentially free from tertiary amine groups or ammonium groups.

11. A thermoplastic polyurethane as set forth in claim 10, wherein said composition has a surface resistivity of less than about $1 \times 10^{12}$ Ohms/sq and a volume resistivity of less than about $1 \times 10^{12}$ Ohms/cm.

12. A thermoplastic polyurethane as set forth in claim 10, wherein said composition has a surface resistivity of less than about $1 \times 10^{12}$ Ohms/sq and a volume resistivity of less than about $1 \times 10^{12}$ Ohms/cm.

13. A thermoplastic polyurethane as set forth in claim 10, wherein said composition has a percent light transmission greater than 50 percent for 20 mil film as measured according to ASTM D-1003-6I; and a percent haze value less than 60 percent for a 20 mil film as measured using a Hunterlab model D-54P-5 spectrophotometer or equivalent.

14. A thermoplastic polyurethane as set forth in claim 13, wherein said composition has a percent light transmission greater than 70 percent for 20 mil film as measured according to ASTM D-1003-61; and a percent haze value less than 30 percent for a 20 mil film as measured using a Hunterlab model D-54P-5 spectrophotometer or equivalent.

15. A thermoplastic polyurethane as set forth in claim 10, wherein said composition has a percent light transmission greater than 80 percent for 20 mil film as measured according to ASTM D-1003-61; and a percent haze value less than 20 percent for a 20 mil film as measured using a Hunterlab model D-54P-5 spectrophotometer or equivalent.

16. A thermoplastic polyurethane composition for use as an electrostatic dissipating agent comprising:

the reaction product of a hydroxyl-terminated ethylene ether oligomer having an average molecular weight of from about 200 to about 10,000, reacted with a nonhindered diisocyanate and an aliphatic extender glycol to produce said thermoplastic polyurethane, said oligomer intermediate being a polyethylene glycol consisting of repeating ethylene ether units n wherein n is from about 4 to about 250; wherein said nonhindered diisocyanate is an aromatic or cycloaromatic diisocyanate; wherein said extender glycol consists of an aliphatic non-ether glycol having from 2 to 6 carbon atoms and containing only primary alcohol groups; and wherein said thermoplastic polyurethane is essentially free from tertiary amine or ammonia groups.

17. A shaped article having electrostatic dissipating properties comprising:

the reaction product of a hydroxyl-terminated ethylene ether oligomer having an average molecular weight of from about 500 to about 5,000, reacted with a nonhindered diisocyanate and an aliphatic extender glycol to produce said thermoplastic polyurethane, said oligomer intermediate being a polyethylene glycol consisting of repeating ethylene ether units n wherein n is from about 4 to about 250; wherein said nonhindered diisocyanate is an aromatic or cycloaromatic diisocyanate; wherein said extender glycol consists of an aliphatic non-ether glycol having from 2 to 6 carbon atoms and containing only primary alcohol groups; and wherein said thermoplastic polyurethane is essentially free from tertiary amine or ammonia groups.

* * * * *